(12) United States Patent
Yoo

(10) Patent No.: US 10,120,237 B2
(45) Date of Patent: Nov. 6, 2018

(54) DISPLAY APPARATUS

(71) Applicant: SAMSUNG ELECTRONICS CO., LTD., Suwon-si, Gyeonggi-do (KR)

(72) Inventor: Jun-Mo Yoo, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/617,274

(22) Filed: Jun. 8, 2017

(65) Prior Publication Data

US 2018/0031924 A1    Feb. 1, 2018

(30) Foreign Application Priority Data

Jul. 26, 2016 (KR) ........................ 10-2016-0094722

(51) Int. Cl.
| | | |
|---|---|---|
| *G09F 13/04* | (2006.01) | |
| *G09F 13/08* | (2006.01) | |
| *G02F 1/1335* | (2006.01) | |
| *G02F 1/1333* | (2006.01) | |

(52) U.S. Cl.
CPC .. *G02F 1/133615* (2013.01); *G02F 1/133308* (2013.01); *G02F 1/133605* (2013.01); *G02F 1/133603* (2013.01); *G02F 2001/13332* (2013.01); *G02F 2001/133314* (2013.01); *G02F 2201/465* (2013.01)

(58) Field of Classification Search
CPC ........ G02F 1/00; G02F 1/0105; G02F 1/1333; G02F 1/133308; G02F 2001/133311–2001/133334; G02F 2001/133553; G02F 2001/13356; G02F 2001/133562; G02F 2001/133565; G02F 2001/133567; G02F 1/336; G02F 1/133602; G02F 1/133603; G02F 1/133604; G02F 1/133605; G02F 1/133606; G02F 2001/133607; G02F 1/133608; G02F 1/133611; G02F 1/133615; G02F 2001/133616
USPC ............ 362/97.1–97.4, 632–634; 349/58–60
See application file for complete search history.

(56) References Cited

U.S. PATENT DOCUMENTS

| | | |
|---|---|---|
| 7,599,012 B2 | 10/2009 | Nakamura et al. |
| 2002/0141192 A1 | 10/2002 | Tiao et al. |
| 2013/0027966 A1 | 1/2013 | Ko et al. |
| 2013/0148331 A1 | 6/2013 | Kim et al. |
| 2014/0204609 A1 | 7/2014 | Shin et al. |

FOREIGN PATENT DOCUMENTS

EP    2821819    1/2015

OTHER PUBLICATIONS

International Search Report dated Sep. 19, 2017 in counterpart International Patent Application No. PCT/KR2017/005902.

*Primary Examiner* — Jason Moon Han
(74) *Attorney, Agent, or Firm* — Nixon & Vanderhye, P.C.

(57) ABSTRACT

The present disclosure relates to a display apparatus that reflects light emitted from a light source to a display panel side through a reflecting member without having a configuration corresponding to a light guide plate, in which light emitted from a light source substantially uniformly reaches a reflecting member, a corner member may be disposed on the corner side of the cover member where the light source module is not disposed so that the light incident on the corner side is reflected toward the display panel side to irradiate light to the display panel side.

19 Claims, 15 Drawing Sheets

DISPLAY APPARATUS

CROSS-REFERENCE TO RELATED APPLICATION

This application is based on and claims priority under 35 U.S.C. § 119 to Korean Patent Application No. 10-2016-0094722, filed on Jul. 26, 2016 in the Korean Intellectual Property Office, the disclosure of which is incorporated by reference herein in its entirety.

BACKGROUND

1. Field

The present disclosure relates generally to a display apparatus with an improved back light unit.

2. Description of Related Art

Generally, a display apparatus is an apparatus for displaying a screen, which includes a monitor and a television. The display apparatus includes a self-emission display panel such as organic light-emitting diodes (OLED) or a non-emissive display panel such as a Liquid Crystal Display (LCD) panel.

Embodiments of the present disclosure relate to a non-emissive display panel, which includes a display panel (for example, a LCD panel) to display a screen, and a backlight unit disposed behind the display panel.

The backlight unit includes a light source module disposed behind the display panel and configured to generate light. Light generated from the light source module is irradiated to the display panel. If a light source is disposed around one edge of the display panel, it is difficult to irradiate light uniformly to the entire area of the display panel, resulting in the luminance difference on the entire screen.

SUMMARY

Therefore, it is an example aspect of the present disclosure to provide a display apparatus capable of effectively improving a dark area generated at corners of a display panel when light emitted from a light source is irradiated to the display panel through a reflecting member.

In accordance with an example aspect of the present disclosure, a display apparatus includes a display panel having a pair of first sides and a pair of second sides, a cover supporting the display panel, a light source module comprising a light source and extending along a direction in which the pair of first sides extend, and a first reflecting member disposed adjacent to at least one of the pair of first sides, the first light reflecting member comprising a light reflecting surface and configured to reflect light emitted from the light source module toward the display panel, a second reflecting member comprising a light reflecting surface and configured to reflect the light emitted by the light source module toward the first reflecting member side, and a corner member comprising a light reflecting surface disposed between the pair of second sides and both ends in the longitudinal direction of the light source module.

The corner member is configured to reflect light transmitted to the corner member toward the first reflecting member, the second reflecting member or the display panel side.

The display apparatus further comprising a chassis disposed on a front side of the display panel displaying an image forward.

The cover includes an coupling portion extending forward from both ends of the cover member corresponding to the pair of second sides configured to be coupled with the chassis and an inclined portion extending rearward from the coupling portion and being inclined with respect to the coupling portion, wherein the corner member is disposed in contact with the coupling portion and the inclined portion.

The cover further includes a support portion extending from the coupling portion and configured to support the display panel, wherein the corner member is disposed in a space provided between the coupling portion, the inclined portion, and the support portion.

The cover further includes a seating surface extending from one side of at least one of the coupling portion, the inclined portion, and the support portion, wherein the corner member is seated on the seating surface.

The corner member further includes a hook configured to be hooked to the seating surface.

The seating surface includes coupling protrusion protruding upwardly along an extending direction of the pair of second sides, and the corner member further includes an insertion hole into which the coupling protrusion is inserted.

The corner member is provided to be seated along the extending direction of the pair of second sides.

The corner member further includes a first surface corresponding to the seating surface and facing upward, and a second surface extending in the extending direction of the pair of second sides from the first surface and formed along the coupling portion and the inclined portion and the support portion.

A surface of the first surface and a surface of the second surface comprise a white color.

The display apparatus further comprising a printed circuit board (PCB) electrically connected to the display panel.

The corner member includes a guide portion configured to guide the position of the printed circuit board.

The guide portion includes a first extending portion extending downwardly along an extending direction of the pair of second sides from one side of the corner member contacting the seating portion, and a second extending portion bent and extended from the extending portion.

The printed circuit board is disposed in a space formed between the first extending portion and the second extending portion.

The printed circuit board is disposed to be guided in the guide portion such that a mounting surface on which the electrical component is mounted is disposed to face the extending direction of the pair of second sides.

The display apparatus further comprising a supporting configured to support the light source module and the second reflecting member and disposed on the cover member, and a gasket electrically connecting the support member to the printed circuit board.

In accordance with another example aspect of the present disclosure, a display apparatus includes a display panel configured to display an image forward, a chassis provided on a front side of the display panel, a cover supporting the display panel and coupled at a rear side of the chassis, the cover including an coupling portion extending from both ends of the cover member configured to be coupled with the chassis and an inclined portion extending rearward from the coupling portion and being inclined with respect to the coupling portion, a light source module comprising a light source disposed behind the display panel and disposed along a lateral direction of the display panel, a corner member comprising a reflective surface disposed in a corner area formed between the coupling portion, the inclined portion, and the outside of both side ends of the light source module to reflect light generated from the light source module.

The cover further includes a seating surface extending from one side of at least one of the coupling portion and the inclined portion and formed in the corner area, and the corner member is hooked to the seating surface The further comprising a first reflecting member comprising a reflective surface disposed on a front surface side of the cover and configured to reflect the light received from the light source module toward the display panel and a second reflecting member comprising a reflective surface disposed between the light source module and the first reflecting member configured to reflect light emitted from the light source module toward the first reflecting member.

The corner member configured to reflect the light transmitted to the corner member toward the first reflecting member, the second reflecting member or the display panel.

The display apparatus further includes a printed circuit board (PCB) electrically connected to the display panel.

The corner member includes a guide portion configured to guide the position of the printed circuit board.

In accordance with the other example aspect of the present disclosure, a display apparatus includes a display panel configured to display an image forward, a printed circuit board (PCB) electrically connected to the display panel, a cover supporting the display panel and disposed on a rear side of the display panel, a light source module comprising a light source disposed between the display panel and the cover and arranged toward the cover, a first reflecting member comprising a reflective surface disposed on a front side of the cover and configured to reflect the light emitted from the light source module toward the display panel, a second reflecting member comprising a reflective surface disposed between the light source module and the first reflecting member configured to reflect light emitted from the light source module to the first reflecting member; a corner member comprising a reflective surface disposed in a corner area formed between the outside of both side ends of the second reflecting member and the inside of both side edges of the cover and configured to guide the position of the printed circuit board such that the printed circuit board is positioned below the display panel.

The cover is provided to reflect a light transmitted to the corner member toward the first reflecting member, the second reflecting or display panel.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
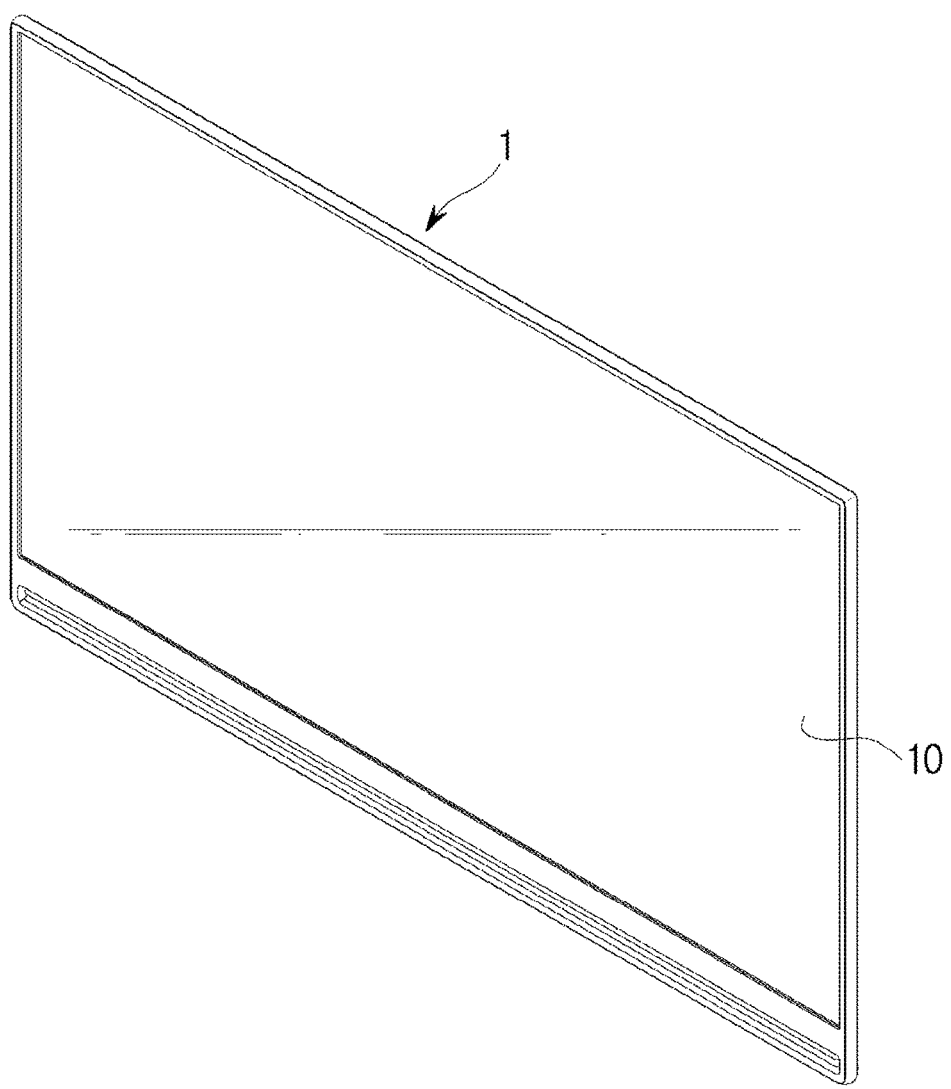
FIG. 1 is a perspective view illustrating an example display apparatus according to an example embodiment of the present disclosure.

Various example embodiments described in this disclosure and configurations illustrated in drawings are only examples of the various embodiments set forth in the disclosure. The disclosure covers various modifications that may be substituted for the embodiments and drawings herein at the time of filing of this application.

In addition, like reference numerals or symbols used in the drawings refer to parts or elements that perform substantially the same function.

In addition, terms used in the present disclosure are merely used to describe the example embodiments and are not intended to limit and/or restrict the embodiments. An expression used in the singular encompasses the expression of the plural unless it has a clearly different meaning in context. In the present disclosure, the terms such as "including," "having," and "comprising" are intended to indicate the presence of the features, numbers, steps, actions, elements, parts, or combinations thereof disclosed in the specification, and are not intended to preclude the possibility that one or more other features, numbers, steps, actions, elements, parts, or combinations thereof may be present or added.

In addition, it should be understood that although the terms "first," "second," etc. may be used herein to describe various elements, the elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

Hereinafter, various example embodiments of the present disclosure will be described in greater detail with reference to the accompanying drawings.

Although the various example embodiments of the present disclosure will be described with a flat display apparatus 1 as an example, the example embodiments of the present disclosure may also be applied to a curved display apparatus, or a bendable or flexible display apparatus capable of changing between a curved state and a flat state.

The embodiments of the present disclosure may be applied to all kinds of display apparatuses regardless of the screen sizes. For example, the embodiments of the present disclosure may also be applied to a product, such as a smart television and a monitor, which can be installed on a table, a wall, a ceiling, etc., and a portable product, such as a tablet, a notebook, a smart phone, and an ebook, or the like but is not limited thereto.

The terms 'front direction' and 'front surface' used herein are based on the front surface of a display panel 10 illustrated in FIG. 1, on which the display panel 10 displays images, the terms 'upper portion' and 'lower portion' refer to the upper and lower portions of a display apparatus 1 illustrated in FIG. 1, and the terms 'both directions' and 'side directions' refer to the left and right directions of the display apparatus 1 illustrated in FIG. 1

As illustrated in FIGS. 1 to 4, the display apparatus 1 may include the display panel 10 on which images are displayed, a diffusion plate 30 disposed behind the display panel 10 and configured to diffuse light transmitted from behind and to transmit the diffused light to the display panel 10 located in front of the diffusion plate 30, an optical sheet 20 provided between the display panel 10 and the diffuser plate 30 to improve the optical characteristics of light diffused by the diffuser plate 30, a chassis 40 coupled to the front portion of the display panel 10, and a cover 50 (hereinafter, the cover 50 may also be referred to as a cover member 50) coupled to the rear portion of the chassis 40 and configured to support the display panel 10. The display apparatus 1 may further include a middle mold 60 coupled between the chassis 40 and the cover member 50 and configured to support the display panel 10.

The display panel 10 may include a liquid crystal panel formed by sealing a liquid crystal (not shown) between two glass substrates (not shown) provided with electrodes. A Printed Circuit Board (PCB) 11 for transmitting information to the display panel 10 may be disposed below the display panel 10. A Chip On Film (COF) 12 for electrically connecting the PCB 11 to the display panel 10 may also be disposed below the display panel 10.

The optical sheet 20 may include a diffusion sheet for diffusing light transmitted through the diffusion plate 30, a prism sheet for condensing the diffused light vertically toward the display panel 10, and a protection sheet for protecting the prism sheet.

The chassis 40 may be disposed on the front surface of the display panel 10, and coupled with the cover member 50 disposed behind the display panel 10. The display panel 10, the optical sheet 20, and the diffuser plate 30 may be disposed between the chassis 40 and the cover member 50, and disposed by the cover member 50 in space formed by combining the chassis 40 with the cover member 50. More specifically, the display panel 10, the optical sheet 20, and the diffuser plate 30 may be supported by the middle mold 60 provided between the chassis 40 and the cover member 50, and the middle mold 60 may be supported by the chassis 40 and the cover member 50 at the front and rear portions.

According to an example embodiment of the present disclosure, the chassis 40 can form the appearance of the front surface of the display apparatus 1 without a separate cover member. However, the present disclosure is not limited to this, and a front cover covering the chassis 40 may be separately provided to form the appearance of the display apparatus.

In general, a structure for supporting the middle mold 60 at the front and rear portions may be a top chassis and a bottom chassis. However, in the present disclosure, the chassis 40 corresponding to a general top chassis and the cover 50 corresponding to a general bottom chassis can support the middle mold 60 at the front and rear portions.

According to an example embodiment of the present disclosure, the cover 50 can form the appearance of the rear surface of the display apparatus 1 without a separate additional cover member. However, the present disclosure is not limited thereto, and the cover 50 may be formed as a general bottom chassis of a display apparatus, and in this case, an additional cover may be provided on the rear portion.

The cover member 50 may be disposed behind the display panel 10, and may support the display panel 10 as described above. As will be described later, the cover member 50 may support a light source module 100 including a light source 101 and first and second reflecting members 110 and 120.

The light source module 100 provided with a plurality of light sources 101 may be disposed in the lower portion of the cover member 50. Each light source 101 may include a light emitting diode (LED) as a point light source that can be thinned.

A typical display apparatus transmits light to a display panel using one of a direct type of directly irradiating light by arranging LEDs on the rear region that is opposite to the entire surface of a display panel, and an edge type of irradiating light to a light guide plate to cause the light guide plate to surface-emit the light to a display unit by arranging LEDs around both edges of the light guide plate.

The direct type requires a LED substrate corresponding to the entire surface of the display panel, and accordingly, requires a large number of LEDs. Furthermore, the LEDs require lenses for diffusing light, which needs a large-size substrate, and accordingly, many components should be installed, resulting in an increase of manufacturing cost. Meanwhile, the edge type requires a light guide plate, which may limit molding of a display apparatus, and furthermore, the thickness of the light guide plate increases the total thickness of a display panel.

In order to address these problems and to use a minimum and/or reduced number of light sources, in the display apparatus 1 according to an example embodiment of the present disclosure, the light source module 100 including the plurality of light sources 101 may be disposed around or on only one edge of the cover member 50, and the reflecting members 110 and 120 that can be easily mounted on the cover member 50, instead of the light guide plate, may be provided to effectively irradiate light toward the display panel 10.

More specifically, the light source module 100 may be disposed in the lower portion of the cover member 50 in such a way to be inclined toward the cover member 50 such that the plurality of light sources 101 face the cover member 50. The light source module 100 may be formed in the shape of a rectangular plate extending in one direction, and may include a mounting surface 102 on which the plurality of light sources 101 are arranged.

The light source module 100 may be disposed by a support member 130 which is coupled with the cover member 50 at the front lower portion of the cover member 50 and protrudes in the front direction from the cover member 50. The support member 130 may further support the second reflecting member 120 which will be described later, as well as the light source module 100. The support member 130 may be detachably attached to the light source module 100, although not limited to this. According to another example, the support member 130 may be integrated into the cover member 50.

Also, the light source module 100 may be directly coupled with the cover member 50, or supported by another configuration instead of the support member 130. Also, the light source module 100 may be disposed in another configuration such as the middle mold, instead of the cover member 50, to be located in the lower portion of the cover member 50 in the front direction from the cover member 50.

The first reflecting member 110 may be disposed in the front direction from the cover member 50 to reflect light generated by the light source 101 to the display panel 10. According to an embodiment of the present disclosure, since the light source module 100 is disposed around one edge of the display apparatus 1, the light source module 100 cannot irradiate light uniformly to the entire area of the display panel 10. As a result, the light uniformity of the display panel 10 may change, and the luminance of the screen may become non-uniform, so that reliability in performance of the display apparatus 1 may be lowered.

Accordingly, if light emitted from the light source 101 is reflected by the first reflecting member 110 having an area corresponding to the display panel 10 in the front direction from the cover member 5, the light can be irradiated uniformly to the entire area of the display panel 10.

According to an embodiment of the present disclosure, light irradiated from the light sources 101 may be reflected by the first reflecting member 110 disposed in the front direction from the cover member 50 to be directed toward the display panel 10. However, light irradiated from the light sources 101 may be reflected directly by the cover member 50 to be directed toward the display panel 10.

That is, the cover member 50 may itself function as a reflecting member, without adding another configuration. In order to increase the efficiency of reflection of light, a release material may be coated or applied on the entire surface of the cover member 50, or a reflecting sheet may be attached on the front surface of the cover member 50.

The display apparatus 1 may include the second reflecting member 120 disposed between the light source module 100 and the first reflecting member 110 so that light emitted from the light sources 101 can more completely arrive at the first reflecting member 110.

The second reflecting member 120 may be disposed adjacent to the light source module 100 to reflect at least a part of light emitted from the light sources 101 so that the reflected light is directed to the first reflecting member 110.

The second reflecting member 120 may be provided in the form of a reflector. The second reflecting member 120 may include a reflecting surface 121 facing the light sources 101 and having a curved surface to reflect light emitted from the light sources 101 toward the first reflecting member 110.

The curved surface of the reflecting surface 121 may be concave toward the light source 101, and may reflect incident light toward the first reflecting member 110.

The second reflecting member 120 may be disposed in the front lower portion of the cover member 50 in correspondence to the light source module 100, and may be supported by the support member 130. The second reflecting member 120 may be disposed between the light source module 100 and the first reflecting member 110 in the front-rear direction in the display apparatus 1 to guide at least a part of light emitted from the light sources 101. This will be described in detail, later.

The light source module 100 may be disposed on the side portion of the cover member 50 or the upper portion of the cover member 50, instead of the lower portion of the cover member 50. In this case, the second reflecting member 120 may also be disposed in correspondence to the location of the light source module 100, and the reflecting surface 121 of the second reflecting member 120 may be concave toward the light source 100 and the first reflecting member 110.

Also, the light source module 100 may be disposed on a plurality of edges of the cover member 50, instead of one edge of the cover member 50. For example, a plurality of light source modules 100 may be respectively disposed on both edges of the cover member 50 that are opposite to each other. For example, a plurality of light source modules 100 may be symmetrically arranged on the upper and the lower edges of the cover member 50 or on the left and right edges of the cover member 50, respectively. In this case, a plurality of second reflecting members 120 may be provided to correspond to the number of the light source modules 100 to thus reflect light emitted from the light sources 101 disposed in each light source module 100 to the first reflecting member 110.

Hereinafter, a process in which light emitted from the light source 101 is irradiated to the display panel 10 (or the diffusion plate 30, hereinafter, referred to as the display panel 10) through the first and second reflecting members 110 and 120 will be described in greater detail.

Figure 4:
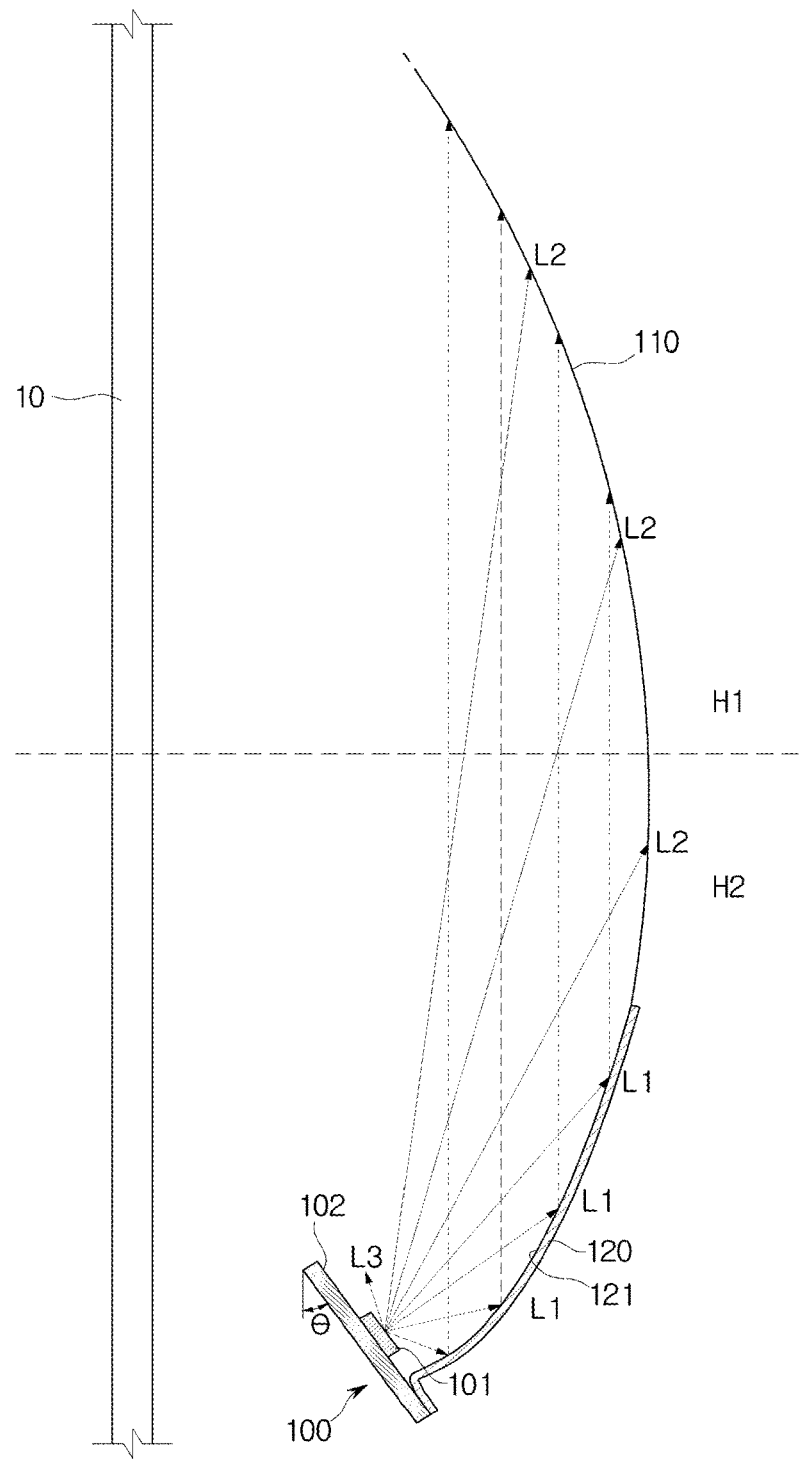
FIG. 4 is a cross-sectional view illustrating an example path of light irradiation in a display apparatus according to an example embodiment of the present disclosure.

As illustrated in FIG. 4, the light source module 100 may be disposed such that the light sources 101 face the first and second reflecting members 110 and 120. For example, the mounting surface 102 of the light source module 100 may face the cover member 50. Accordingly, the mounting surface 102 from which light is irradiated may face the opposite side of the display panel 10.

An angle at which light is emitted from the LEDs of the light sources 101 is usually, for example, about 120 degrees. Accordingly, the light source module 100 may be inclined so that light from the light source 101 can arrive at the upper portion H1 of the first reflecting member 110. The reason is because if the light source module 100 is disposed horizontally to the direction in which the first reflecting member 110 extends, the amount of light that can arrive at the upper portion H1 of the first reflecting member 110 is reduced.

Accordingly, the light source module 100 may be inclined, and an angle of inclination with respect to the display panel 10 may be preferably about 30 degrees. However, the position of the light source module 100 may change depending on the shape of the first and second reflecting members 110 and 120.

As described above, unlike the typical edge type display apparatus or the typical direct type display apparatus, since the light source module 100 is disposed at one edge of the display apparatus 1 having a quadrangular outer appearance, the irradiation amount of light may be reduced around the other edge of the display apparatus 1 where the light source module 100 is not disposed.

Since the light source module 100 is disposed in the lower portion of the cover member 50, a relatively large amount of light may be irradiated to the lower portion H2 of the first reflecting member 110 that is adjacent to the light source module 100, while a relatively small amount of light may be radiated to the upper portion H1 of the first reflecting member 110 that is distant from the light source module 100

Accordingly, since light is irradiated non-uniformly to the first reflecting member 110, light reflected by the first reflecting member 110 may be also transmitted non-uniformly to the display panel 10.

That is, a relatively larger amount of light may be irradiated to an area of the display panel 10 corresponding to the lower portion H2 of the first reflecting member 110 than an area of the display panel 10 corresponding to the upper portion H1 of the first reflecting member 110. Accordingly, non-uniform brightness distribution may occur in the upper and lower areas of the display panel 10, and in the upper area of the display panel 10 having lower brightness, a dark area may be generated.

For this reason, the second reflecting member 120 may be disposed between the light sources 101 and the first reflecting member 110 to disperse light biased to the lower portion H2 of the first reflecting member 110 to the upper portion H1.

More specifically, the reflecting surface 121 of the second reflecting member 120 may be a curved surface that is concave toward the light sources 101 and the first reflecting member 110 to reflect light irradiated from the light sources 101 toward the first reflecting member 110.

The reflecting surface 121 may be a parabola-shaped curved surface. Also, the light sources 101 may be disposed at a focal point of the parabola of the reflecting surface 121. Also, the first reflecting member 110 may be disposed in a direction in which the axis of the parabola of the reflecting surface 121 faces.

When light emitted from the light sources 101 arrives at the reflecting surface 121, the light may be reflected by the reflecting surface 121 in the direction parallel to the axis of the parabola. The reason is because the light sources 101 are disposed at the focal point of the parabola of the reflecting surface 121, as described above Accordingly, light L1 reflected by the reflecting surface 121 may all be directed in one direction in parallel. The surface of the first reflecting member 110 may be disposed in the axial direction of the parabola of the reflecting surface 121 so that light L1 reflected by the reflecting surface 121 can all arrive at the first reflecting member 110.

More specifically, light L1 emitted from the light sources 101 toward the reflecting surface 121 may be reflected in the axial direction of the parabola of the reflecting surface 121, arrive at the upper portion H1 of the first reflecting member 110, and then be directed toward the display panel 10 by the first reflecting member 110.

If the second reflecting member 120 is not provided, light corresponding to the light L1 may be all irradiated to the lower portion H2 of the first reflecting member 110 so that a great difference in uniformity between light irradiated to the lower portion H2 of the first reflecting member 110 and light irradiated to the upper portion H1 of the first reflecting member 110 may be caused. However, since a part of light irradiated to the lower portion H2 of the first reflecting member 110 may arrive at the upper portion H1 of the first reflecting member 110 by the second reflecting member 120, a difference in irradiation amount of light can be cancelled. A part of light emitted from the light sources 101 may be light L1 directed toward the upper portion H1 of the first reflecting member 110 through the second reflecting member 120, and light L2 irradiated to be directed above the second reflecting member 120 may be directly reflected by the first reflecting member 110 without arriving at the second reflecting member 120 to arrive at the display panel 10. A part of the light L2 may arrive at the lower portion H2 of the first reflecting member 110, and the other part of the light L1 may arrive at the upper portion H1 of the first reflecting member 110.

Another part (L3) of light emitted from the light sources 101 may be directly irradiated toward the display panel 10 without being reflected by the first and second reflecting members 110 and 120.

As described above, in order to compensate for non-uniformity of light caused since the light sources 101 are disposed in the lower portion H2 of the first reflecting member 110 so that the major portion of light emitted from the light sources 101 arrives at the lower portion H2, the second reflecting member 120 may reflect a part of light arrived at the lower portion H2 to the upper portion H1.

Figure 5:
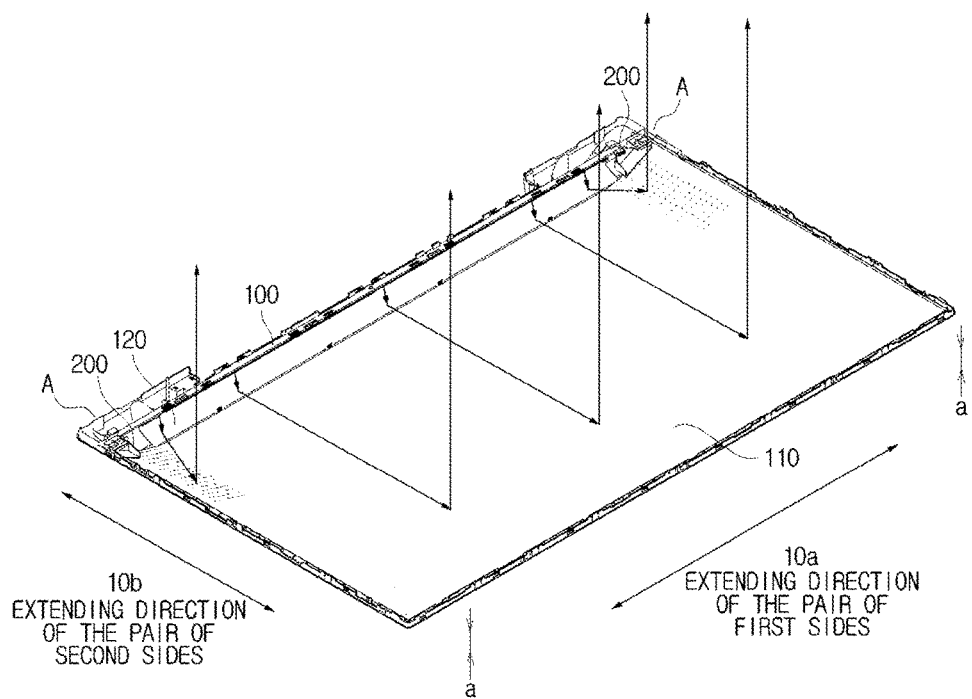
FIG. 5 is a diagram illustrating an example path of light irradiation in a display apparatus according to an example embodiment of the present disclosure.
Figure 6:
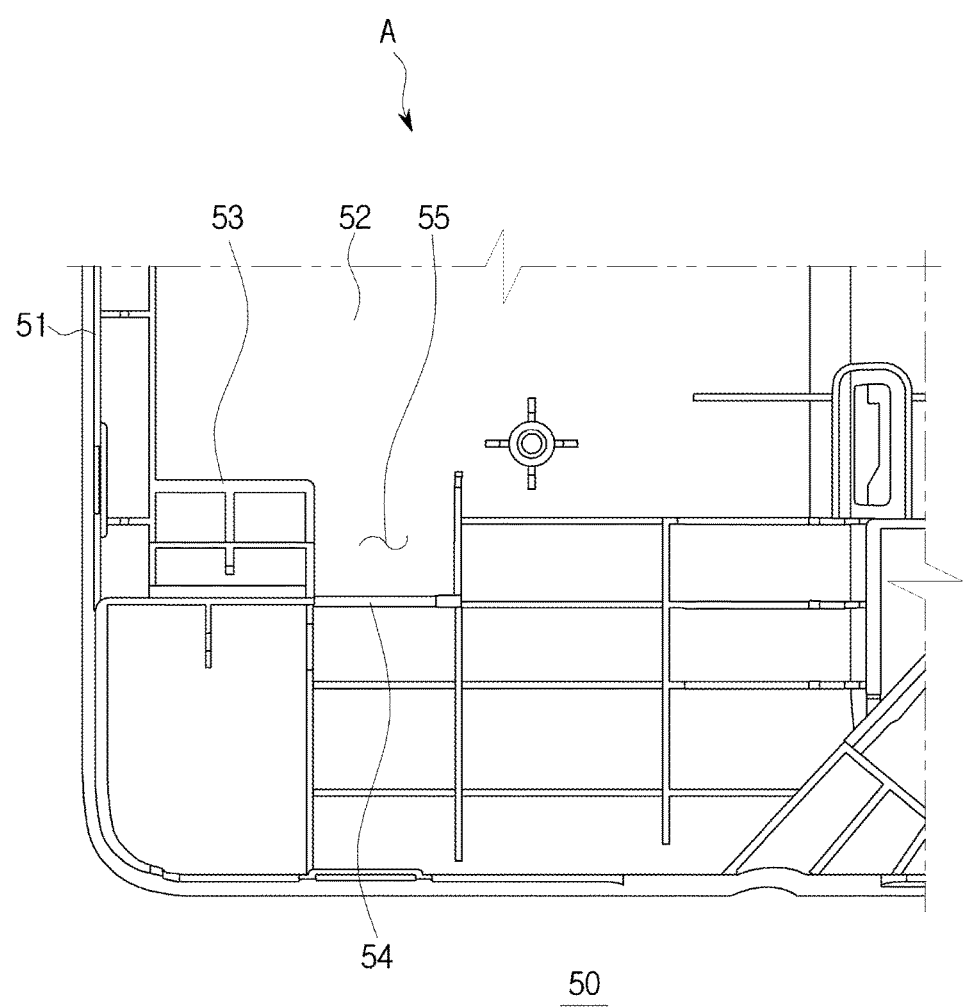
FIG. 6 is a front view illustrating a part of a cover member of an example display apparatus according to an example embodiment of the present disclosure.

However, as illustrated in FIG. 5, since the light source module 100 is disposed around one edge of the display panel 10 or around one edge of the cover member 50, and light generated from the light source module 100 is reflected to the first reflecting member 110 through the second reflecting member 120, light may not be irradiated (or not be sufficiently irradiated) to corner areas A corresponding to both ends of the cover member 50 where the light source module 100 is disposed.

Furthermore, since the first reflecting member 110 and the second reflecting member 120 are not disposed in the corner areas A, light irradiated to the corner areas A may be less reflected than in the other areas.

This is because in the corner areas A, the cover member 50 is disposed, instead of the first reflecting member 110 and the second reflecting member 120 having high reflectance, and the cover member 50 formed of a material including a dark color reflects a smaller amount of light than the first and second reflecting members 110 and 120.

As a result, a dark area may be made at areas of the display panel 10 corresponding to the corner areas A.

In order to address the problem associated with irradiation of the corner areas, the display apparatus 1 according to an example embodiment of the present disclosure may include a corner member 200 disposed at both corners of the cover member 50 where the light source module 100 is disposed, and configured to reflect light to prevent and/or reduce any dark areas from being generated on the display panel 10, The corner member 200 may include a material having high reflectance to reflect incident light toward the display panel 10, thereby preventing and/or reducing dark areas from being generated on the display panel 10.

More specifically, the corner member 200 may reflect incident light to the display panel 10, the first reflecting member 110, or the second reflecting member 120, thereby preventing and/or reducing the corner areas A from absorbing the light.

Figure 2:
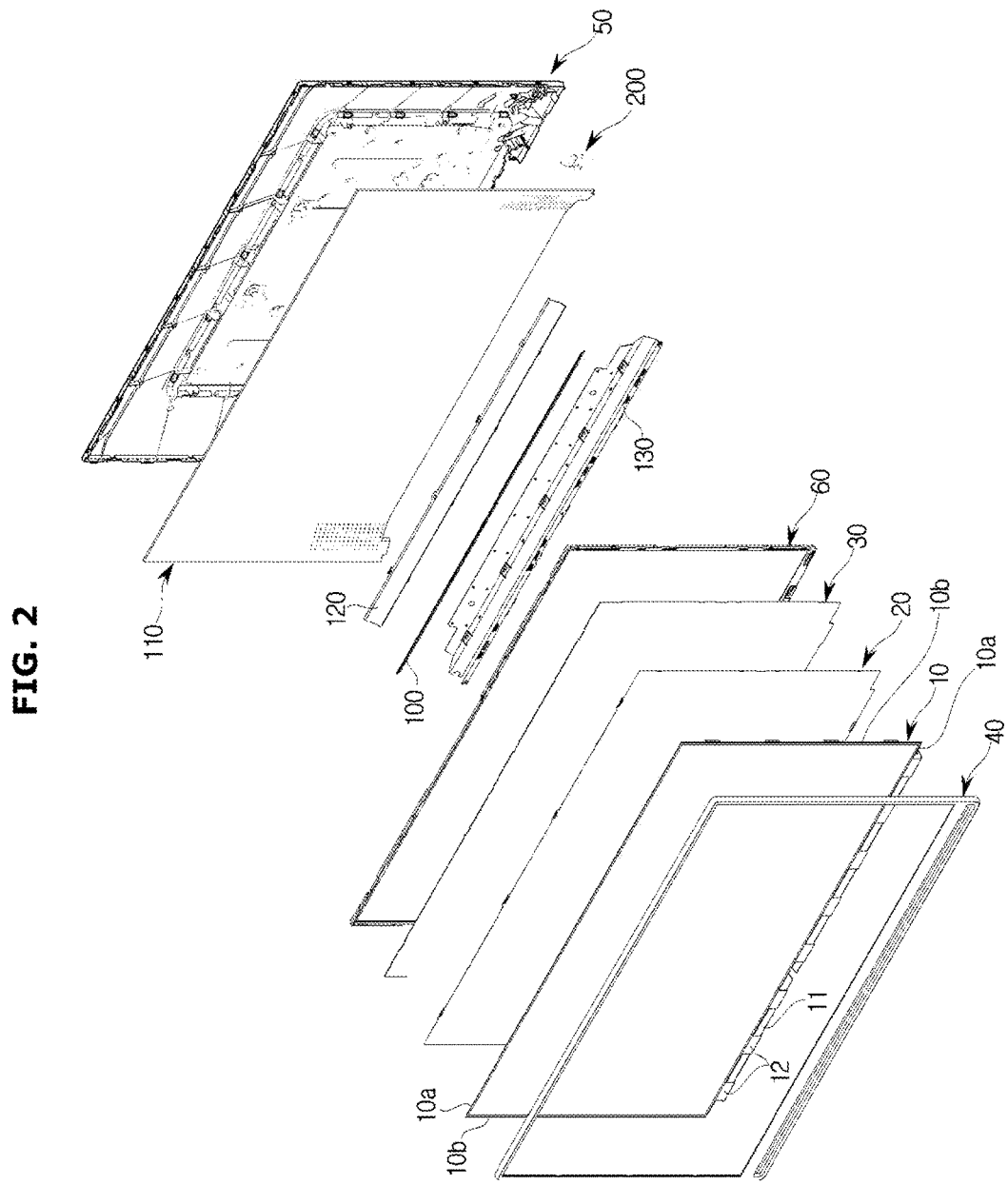
FIG. 2 is an exploded perspective view illustrating an example display apparatus according to an example embodiment of the present disclosure.
Figure 3:
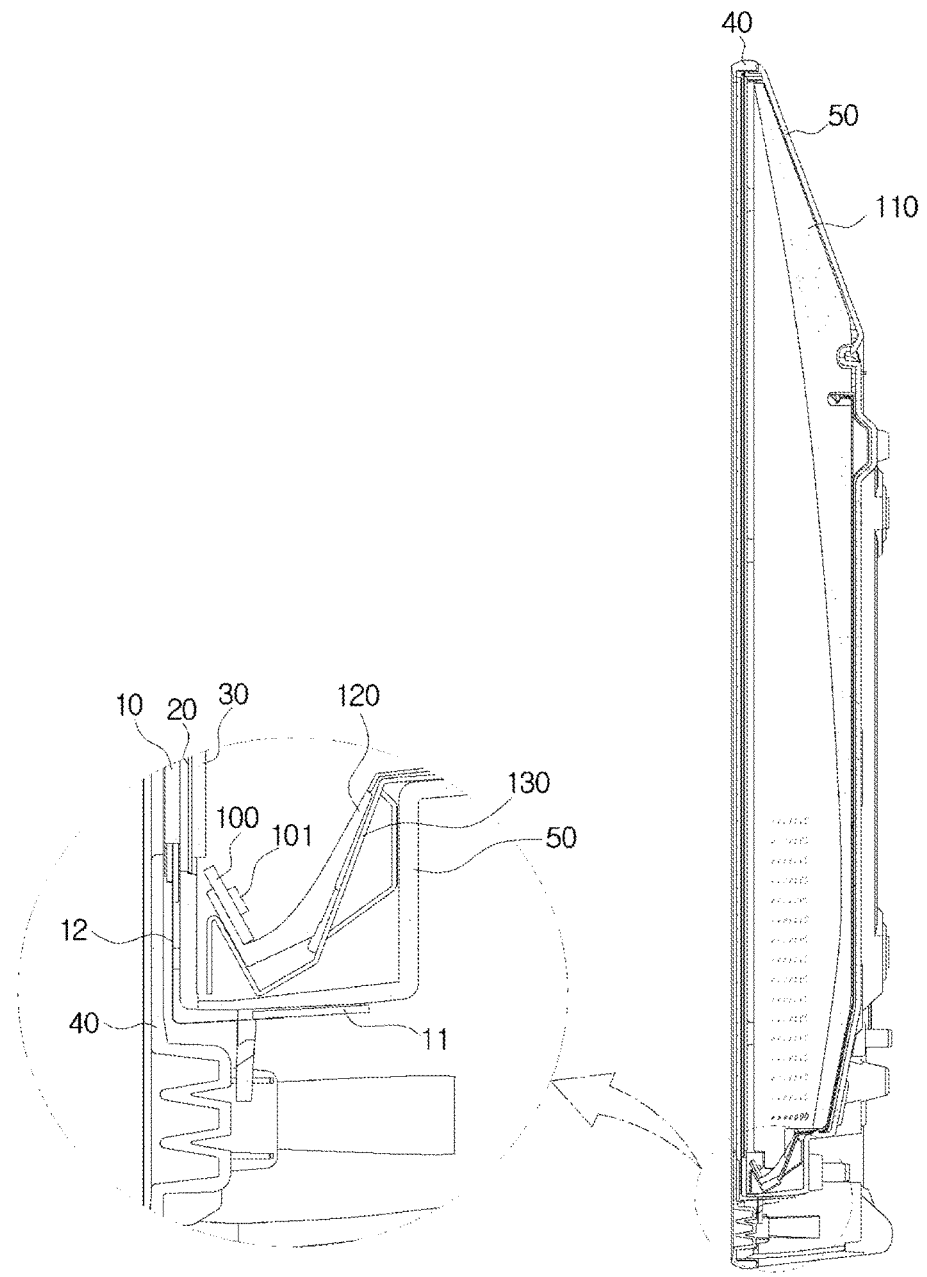
FIG. 3 is side cross-sectional view of an example display apparatus according to an example embodiment of the present disclosure.

As illustrated in FIG. 2, the display panel 10 may include a pair of first sides 10a and a pair of second sides 10b, and ones of the pair of first sides 10a or the pair of second sides 10b may form the long sides of the display panel 10, and the other ones may form the short sides of the display panel 10

As illustrated in FIGS. 2 and 5, the light source module 100 may be disposed adjacent to one of the first sides 10a disposed in the lower portion of the display apparatus 1. The light source module 100 may extend in the longitudinal direction of the first sides 10*a*.

According to an example embodiment of the present disclosure, the light source module 100 may be disposed in the lower portion of the display apparatus 1, and emit light upward. As illustrated in FIG. 5, since the light source module 100 cannot extend longer than the length of the first sides 10*a* of the display panel 10, the light source module 100 may be shorter than the length of the first sides 10*a*. Accordingly, light emitted from the light source module 100 may be irradiated to the first and second reflecting members 110 and 120 in the shape of a fan spreading upward.

Since the corner member 200 is disposed between both ends of the light source module 100 and both ends of the first sides 10*a*, that is, the extended portions a of the pair of second sides 10*b*, it is possible to prevent and/or reduce dark areas from being generated in the areas of the display panel 10 corresponding to the corner areas A.

In other words, the corner member 200 may be disposed between the pair of second sides 10*b* and both ends in longitudinal direction of the light source module 100. According to an embodiment of the present disclosure, the corner member 200 may be disposed at both lower corners of the cover member 50 to prevent dark areas that may occur at the lower edges of the display panel 10.

However, the light source module 100 may be disposed at a location corresponding to one of the pair of second sides 10*b*. In this case, the light source module 100 may extend in the direction in which the second side 10*b* extends, and the corner member 200 may be disposed between the pair of the first sides 10*a* and both ends in longitudinal direction of the light source module 100, that is, at the upper and lower ends of at least one of the right and left edges of the cover member 50.

Also, a pair of light source modules 100 may be provided. In other words, a pair of light source modules 100 may be arranged to correspond to the pair of first sides 10*a*. In this case, the corner member 200 may be disposed between both ends in longitudinal direction of the pair of the light source modules 100 and the pair of the second sides 10*b* so as to be disposed at the four corners of the cover member 50.

Hereinafter, the position and configuration of the corner member 200 will be described in greater detail. According to an example embodiment of the present disclosure, a plurality of corner members 200 may be respectively disposed at a pair of corner areas A formed at both lower corners of the cover member 50 on which the light source module 100 is disposed.

However, it will be understood that a single corner member 200 may be disposed at one of the pair of the corner areas A.

In the current example embodiment, a pair of corner members 200 may be symmetrically disposed to the left and right, and hereinafter, one corner member 200 of the pair of corner members 200 disposed in the pair of corner areas A will be described in order to avoid redundant description.

FIGS. 5 to 10 are views illustrating the corner areas A of the cover member 50, wherein the cover member 50 includes a coupling portion 51 extending from both side ends of the cover member 50 in a vertical direction corresponding to the longitudinal direction of the second sides 10*b*, and protruding forward.

The coupling portion 51 may be coupled with the rear portion of the chassis 40. More specifically, the middle mold 60 may be positioned between the coupling portion 51 and the chassis 40, and the chassis 40 may be coupled with the coupling portion 51 in the front and rear portions of the middle mold 60 to support the middle mold 60 so that the cover member 50 can be coupled with the chassis 40.

The cover member 50 may include an inclined portion 52 extending obliquely toward the rear portion of the coupling portion 51. The inclined portion 52 may be inclined rearward toward the center of the cover member 50.

The cover member 50 may include a support portion 53 extending from one end of the coupling portion 51. The support portion 53 may protrude in the front direction from the cover member 50 to be formed in correspondence to the surface direction of the display panel 10.

Figure 11:
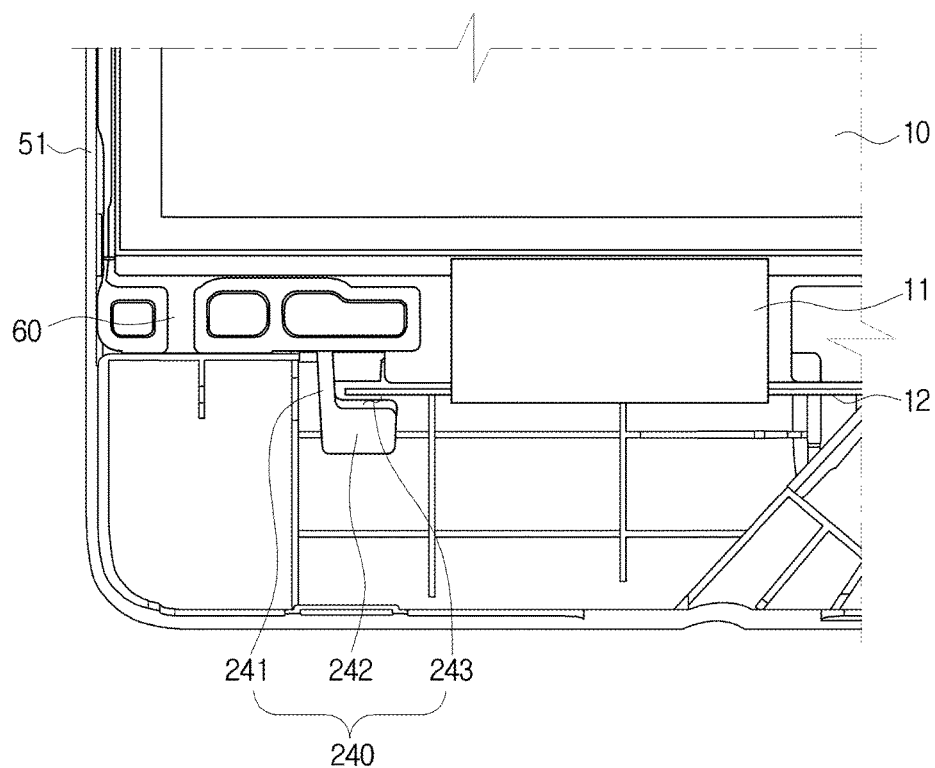
FIG. 11 is a diagram illustrating a state in which a part of the structure of an example display apparatus is supported by a cover according to an embodiment of the present disclosure.

The display panel 10 and the middle mold 60 may rest on the support portion 53 (see FIG. 11). The support portion 53 may press the display panel 10 and the middle mold 60 forward to fix the display panel 10 between the chassis 40 and the cover member 50.

The cover member 50 may include a corner area 55 provided in space formed between the inside of the coupling portion 51, the front portion of the inclined portion 52, and the rear portion of the support portion 53. The corner area 55 may be disposed adjacent to the pair of second sides 10*b* in the lower portion of the cover member 50.

The corner area 55 may be molded integrally with the cover member 50, and made of the same material as the cover member 50. The corner area 55 may be formed of a material having lower reflectance than the first reflecting member 110 or the second reflecting member 120. Accordingly, when light is irradiated toward the corner area 55, a relatively small amount of light may be reflected toward the display panel 10 so that a dark area may be generated on the display panel 10.

As described above, the corner member 200 may rest in the corner area 55 to prevent and/or avoid a dark area from being generated on the display panel 10. More specifically, the corner member 200 may cover the corner area 55 having relatively low reflectance to increase the reflectance of the corner areas A.

The corner member 200 may rest on a resting surface 54 formed in the corner area 55 and extending in the front direction from the cover member 50 to thus be disposed in the corner area 55.

The corner member 200 may include a first surface 210 extending upward in correspondence to the resting surface 54, and a second surface 220 extending upward from the first surface 210, formed to correspond to the side surface of the coupling portion 51, the front surface of the inclined portion 52, and the rear surface of the support portion 53, and facing the center of the space of the corner area 55.

That is, the second surface 220 may be formed along space formed by the coupling portion 51, the inclined portion 52, and the support portion 53 to surround the space in the shape of a substantially triangular prism.

However, the shape of the second surface 220 may change according to the shape of the border of the cover member 50. For example, the cover member 50 may have a quadrangular border without the inclined portion 52. In this case, the second surface 220 may be formed in the shape of a quadrangular pillar in correspondence to the border shape of the cover member 50.

The first surface 210 and the second surface 220 may cover at least a part of the inclined portion 52, the support portion 53, and the coupling portion 51 forming the corner area 55.

The corner member 200 may be injection-molded into one body, and may contain a white material. However, the white material is an example, and the corner member 200 may contain a material such as a mirror having high reflectance.

Figure 7:
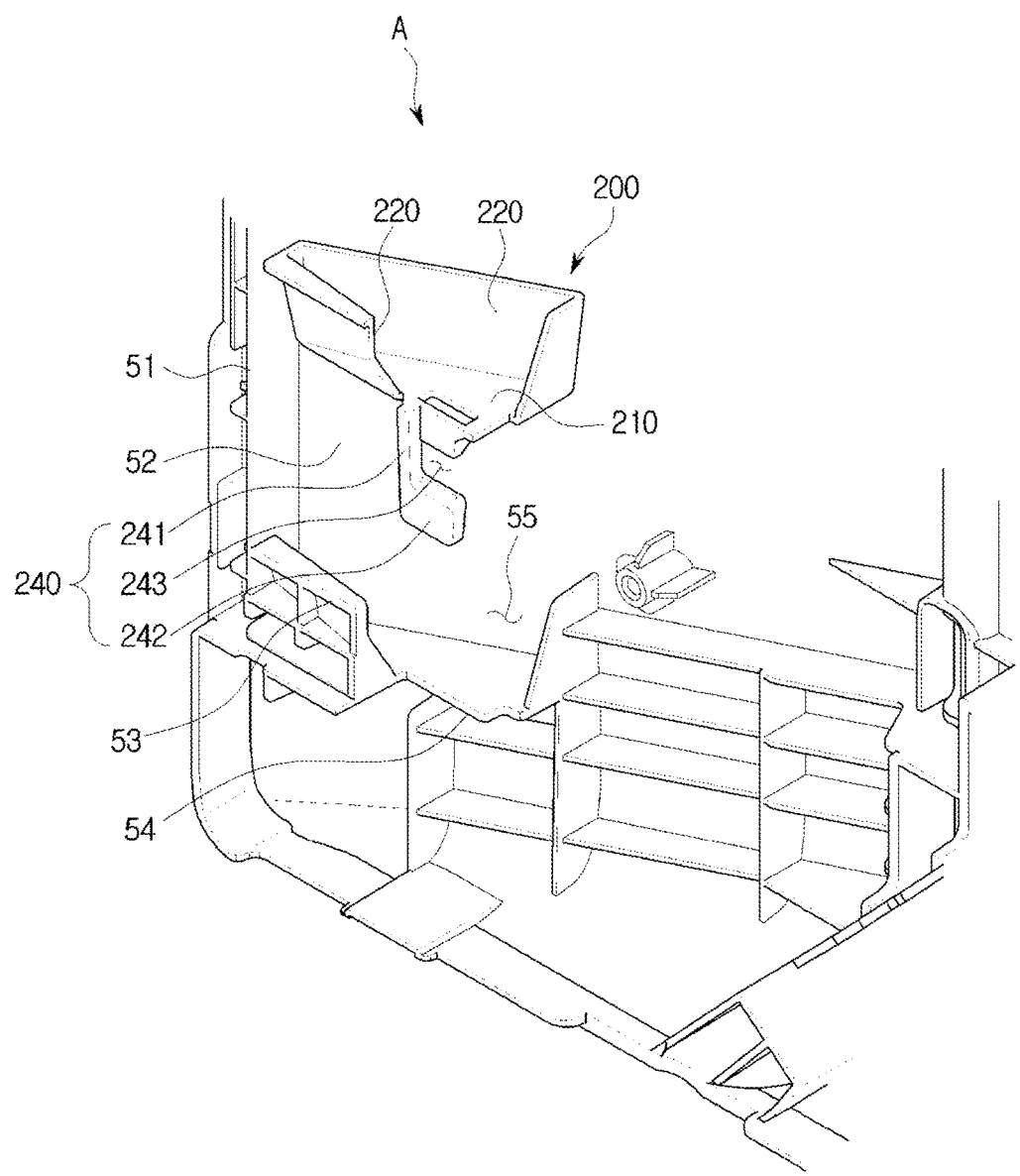
FIG. 7 is an exploded perspective view illustrating a part of the structure of an example display apparatus according to an example embodiment of the present disclosure.
Figure 8:
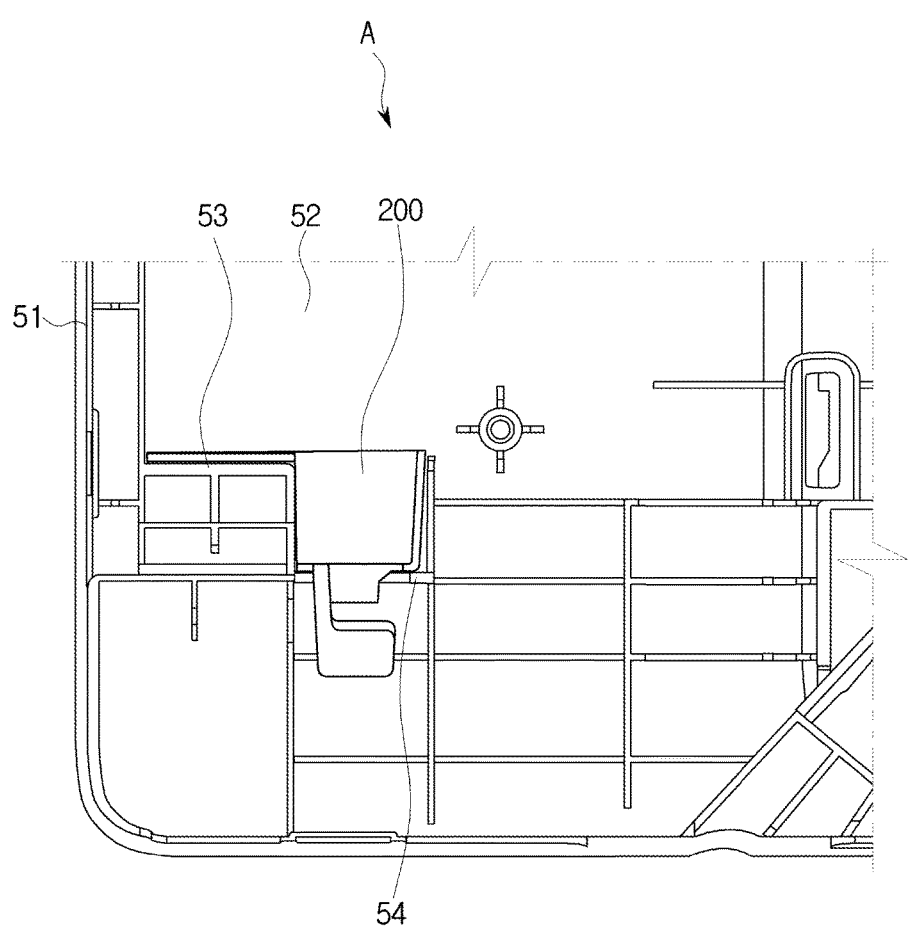
FIG. 8 is diagram illustrating a state in which a corner member is rested on a cover member of a display apparatus according to an example embodiment of the present disclosure.

As illustrated in FIG. 7, the corner member 200 may rest in the corner area 55 from above. The corner member 200 may be coupled to the cover member 50 by being pressed downward to be brought in contact with the seating surface 54.

The corner member 200 may include a hook portion 230 extending downward. The hook portion 230 may be hooked to the resting surface 54 to fix the corner member 200 on the seating surface 54 when the corner member 200 is resting on the seating surface 54.

Figure 9:
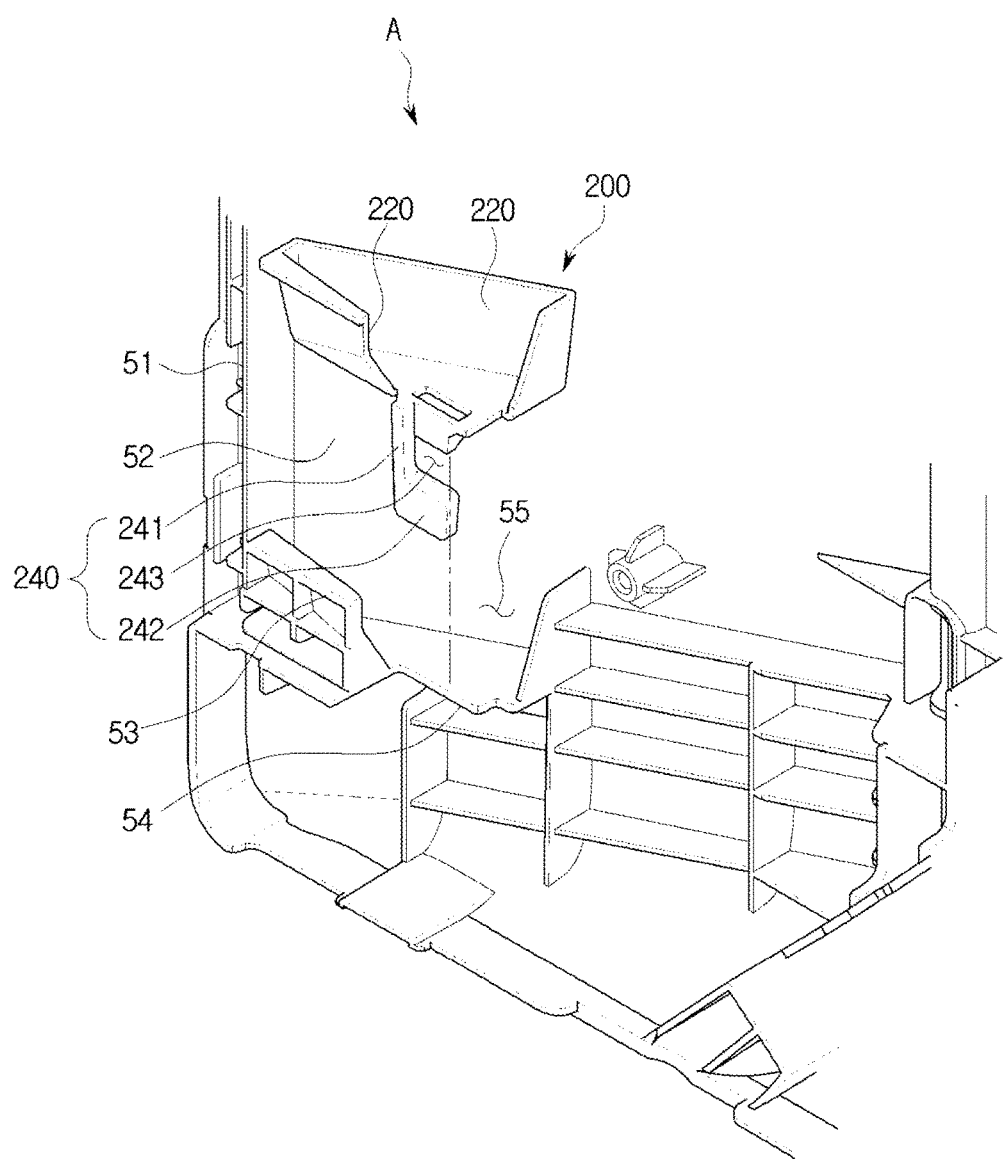
FIG. 9 is a front view of a cover member of an example display apparatus on which the corner member is seated according to an example embodiment of the present disclosure.

The corner member 200 may be hooked when it contacts the resting surface 54 by the hook portion 230 so as to easily couple the corner member 200 with the cover member 50 in the manufacturing process (see FIG. 9). A typical display apparatus removes dark areas generated in the corners using a reflecting tape. However, it is not easy to attach the reflecting tape onto the corners. The corner member 200 according to an embodiment of the present disclosure can be easily coupled with the cover member 50, thereby simplifying the process.

Figure 10:
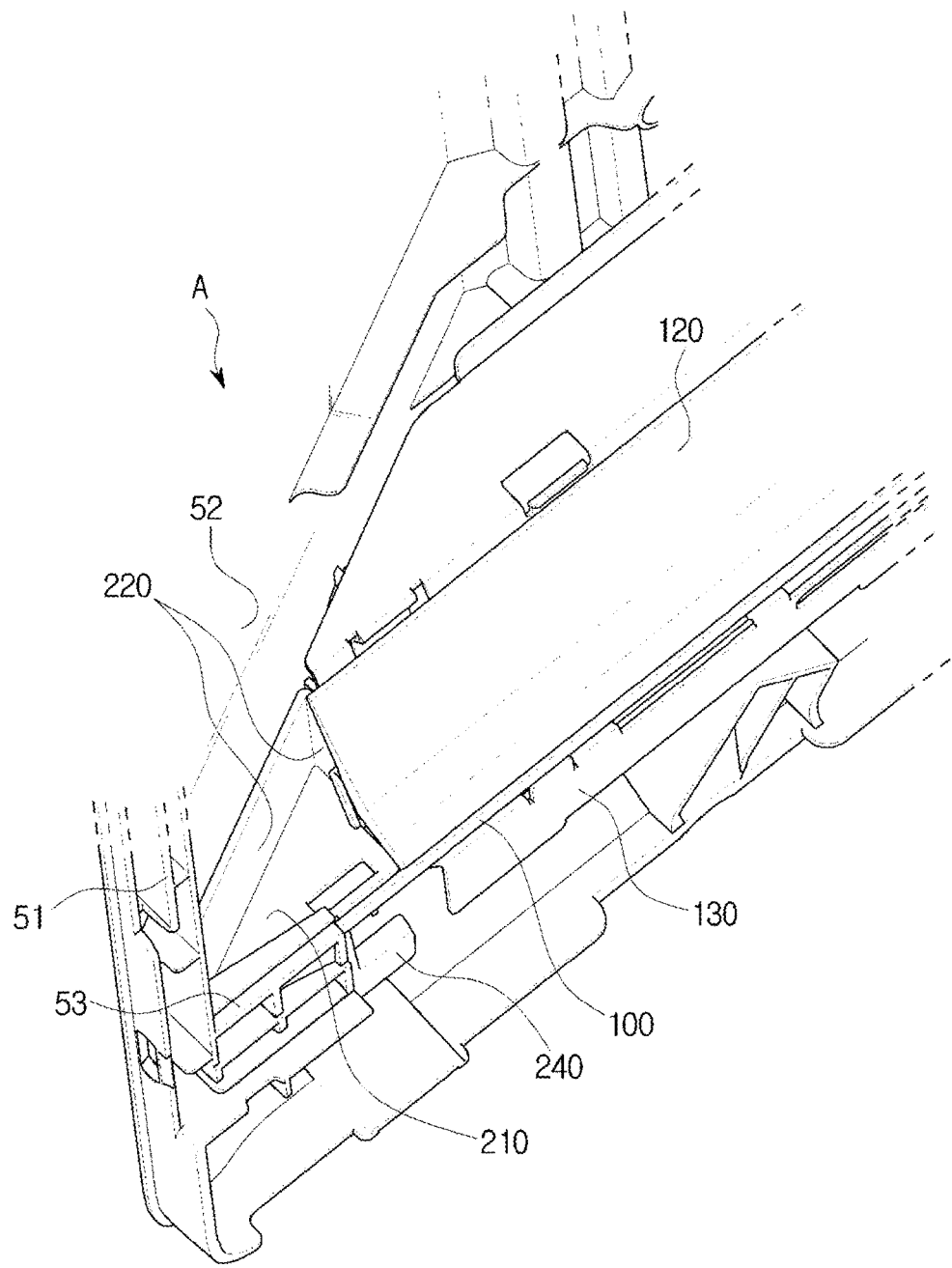
FIG. 10 is a perspective view of a part of an example display apparatus according to an example embodiment of the present disclosure.

As illustrated in FIG. 10, the corner member 200 may be disposed in the corner areas A formed at both lower corners of the cover member 50. More specifically, the corner member 200 may be disposed at both ends of the light source module 100 or at both ends of the second reflecting member 120 to cover a part of the cover member 50 having relatively low reflectance, thereby increasing reflectance.

Hereinafter, a guide portion of the corner member 200 will be described in greater detail.

The corner member 200 may include a guide portion 240 extending downward. The guide portion 240 may include a first extension portion 241 extending downward, and a second extension portion 242 bent from the first extension portion 241 and extending in the direction in which the light source module 100 extends.

In other words, the first extension portion 241 may extend downward from the corner member 200 with respect to the direction in which the second sides 10b extend, and the second extension portion 242 may extend to the center of the cover member 50 with respect to the direction in which the first sides 10a extend.

The guide portion 240 may guide the position of a printed circuit board (PCB) 11 connected to the display panel 10. For example, as illustrated in FIG. 11, the PCB 11 may be provided in guide space 243 formed between the first surface 210 and the first extension portion 241 and second extension portion 242.

The PCB 11 may be connected to the display panel 10 by a COF 12. The COF 12 may be not fixed in shape since it is in the shape of a film so that the COF 12 may be not disposed at a predetermined position by hanging on the PCB 11 unless the PCB 11 is fixed or guided.

Accordingly, in the typical technique, a COF is bent to the lower portion of the display panel to locate a PCB behind a display panel to be substantially orthogonal to the display panel. Accordingly, the PCB is disposed in the front-rear direction of the display apparatus to face the mounting surface of a printed circuit, and the PCB is fixed by adhering one side of the mounting surface to the inner structure of the display apparatus with a tape.

In this case, a process may be required in which a tape is adhered to the inside of the display apparatus and the PCB is adhered to the adhered tape in order to fix the PCB. However, the display apparatus 1 according to an embodiment of the present disclosure may couple the corner member 200 having the guide portion 240 with the cover member 50 to guide the position of the printed circuit board 11 without using a tape.

First, in order to locate the PCB 11 in the guide portion 240, the corner member 200 may be placed in the corner area 55 of the cover member 50, the middle mold 60 and the display panel 10 may be rested on the support portion 53, and the COF 12 connected to the lower portion of the display panel 10 may be bent in the rear direction from the display panel 10.

Due to the bent COF 12, the PCB 11 may be disposed such that the mounting surface of the PCB 11 substantially extends in the vertical direction of the display apparatus 1. At this time, the PCB 11 may penetrate the guide space 243 so as to be disposed on the guide portion 240.

When the printed circuit board 11 is disposed on the guide portion 240, the first surface 210 and the second extended portion 242 may be disposed vertically to prevent the PCB 11 from escaping from the guide portion 240.

Figure 12:
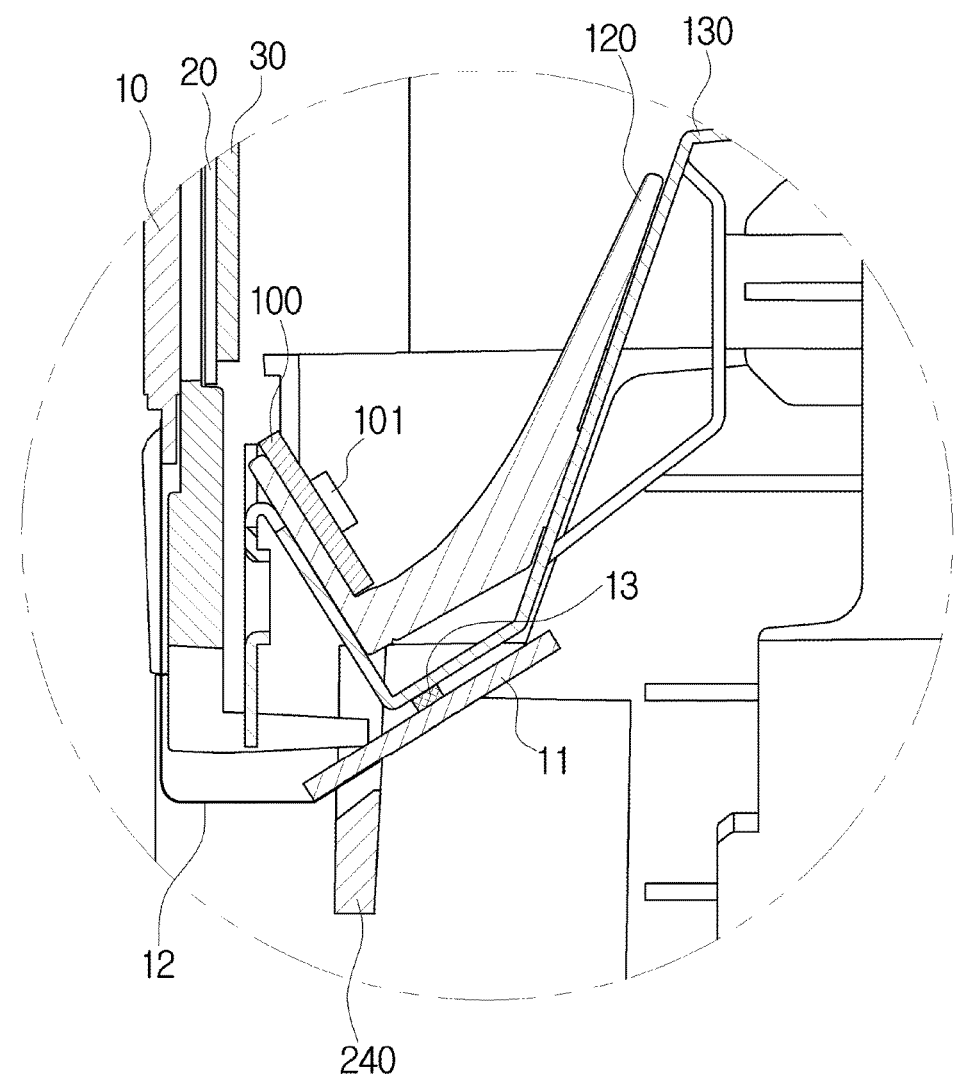
FIG. 12 is a side cross-sectional view of a part of an example display apparatus according to an example embodiment of the present disclosure.

A distance between the first surface 210 and the second extension portion 242 may be longer than the thickness of the printed circuit board 11. As illustrated in FIGS. 11 and 12, the width of the guide space 243 may be greater than the thickness of the PCB 11 to guide the position of the PCB 11. However, the width of the guide space 243 may be equal to the thickness of the PCB 11 so that the PCB 11 can be inserted into the guide portion 240 to be coupled with the guide portion 240.

Preferably, the width of the guide space 243 may be greater than the thickness of the PCB 11 to prevent and/or reduce the likelihood of the guide portion 240 from colliding with the PCB 11 to be damaged when an impact is applied to the display apparatus 1.

Further, although not shown in the drawings, a member for supporting the PCB 11 may be provided on the lower center portion of the cover member 50. One edge of the PCB 11 may be guided by the guide portion 240 to the position where the PCB 11 needs to be disposed, and the other edge of the PCB 11 may be guided to the position to which the PCB 11 needs to be disposed by the member provided on the lower center portion of the cover member 50.

The position of the PCB 11 may be guided by the guide portion 240 as described above. As illustrated in FIG. 12, the PCB 11 may be disposed adjacent to the support member 130.

Various electronic components mounted on the PCB 11 generate harmful radio waves. Especially, EMI (Electromagnetic Interference) formed by such harmful radio waves may be a problem. The EMI may cause malfunction between the electronic components or in external electromagnetic system. Also, since electromagnetic waves are harmful to the human body, a standard is set to limit EMI to a specific level or less.

In order to prevent and/or reduce such EMI, a gasket 13 for shielding electronic waves to prevent EMI may be disposed between the PCB 11 and the support member 130.

The support member 130 may be made of a metal material such as aluminum, and the PCB 11 may be connected to the support member 130 through the gasket 13 to prevent and/or reduce the generation of electromagnetic waves.

Hereinafter, a corner member 200a according to another example embodiment of the present disclosure will be described. The remaining configuration of the corner member 200a except for the configuration of the corner member 200a which will be described below is the same as the configuration according to the above-described example embodiment of the present disclosure, and accordingly, detailed descriptions thereof will be omitted.

Figure 13:
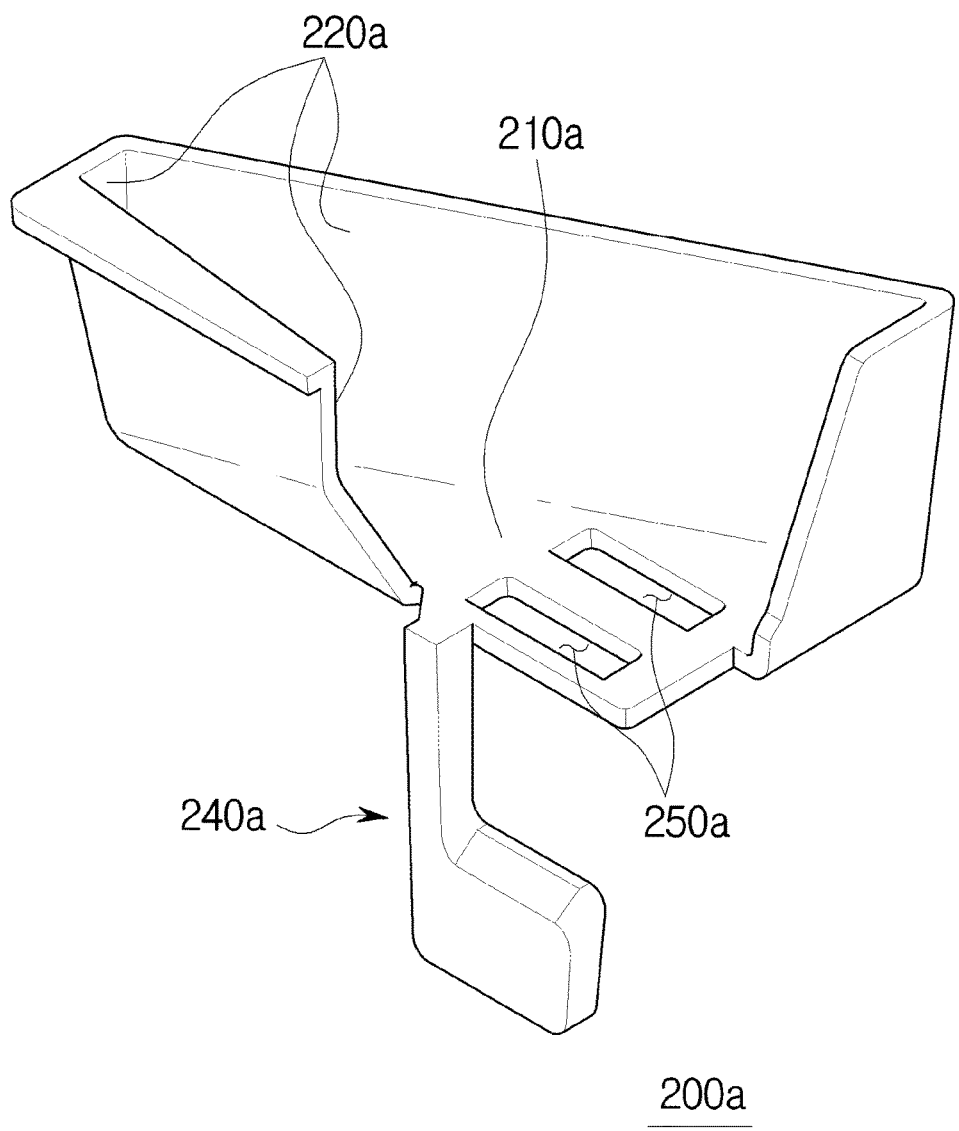
FIG. 13 is a perspective view of a corner member of an example display apparatus according to another example embodiment of the present disclosure.
Figure 14:
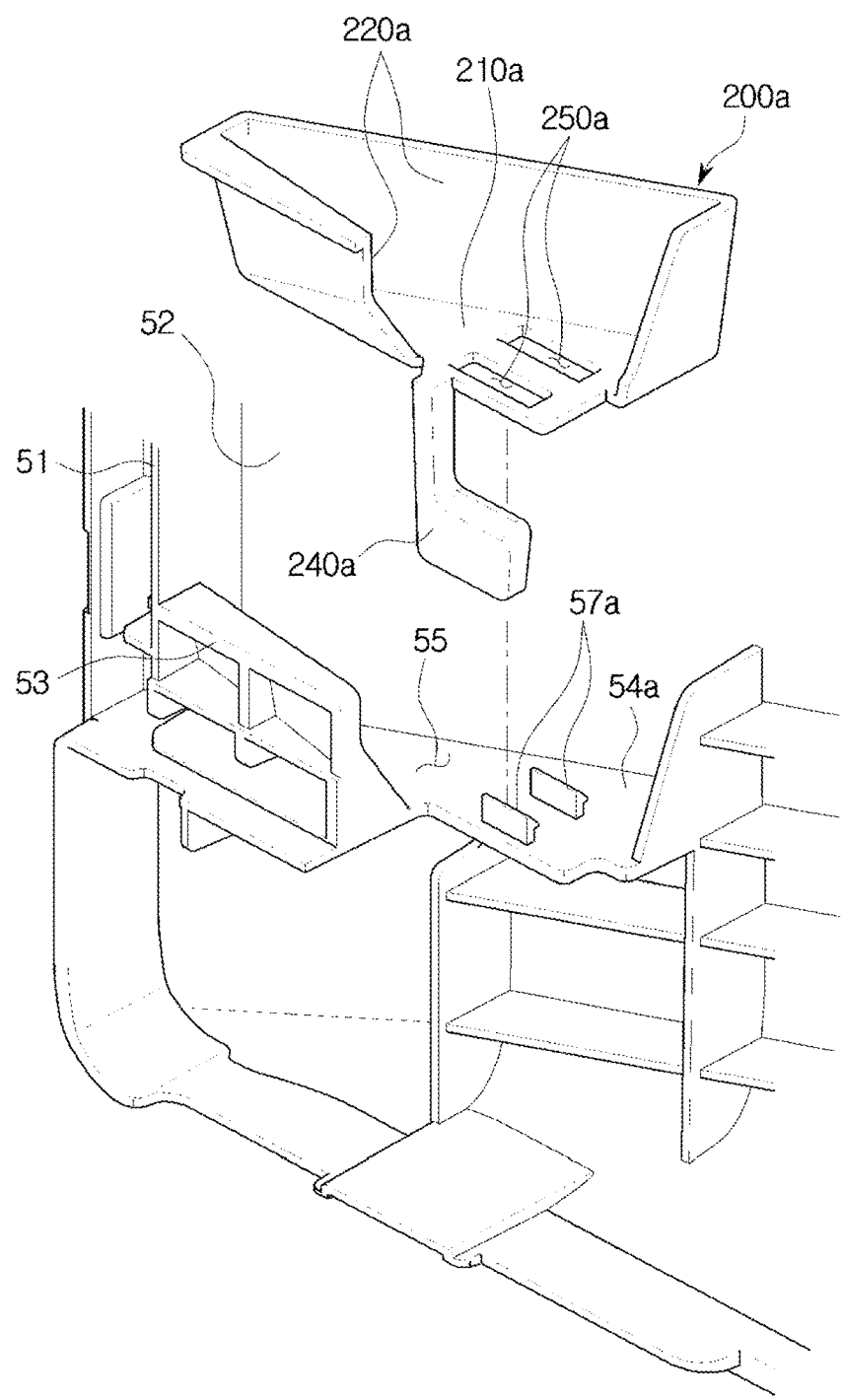
FIG. 14 is an exploded perspective view of a part of a configuration of an example display apparatus according to another example embodiment of the present disclosure.

As illustrated in FIGS. 13 and 14, a resting surface 54a may include one or more coupling protrusions 57a protruding upward. A plurality of coupling protrusions 57a may be provided as illustrated in FIG. 14, however, a single coupling protrusion 57a may be provided.

A first surface 210a of the corner member 200a may be provided with one or more insertion holes 250a into which the coupling protrusion 57a can be inserted. The insertion hole 250a may be provided so as to correspond to the number of the coupling protrusions 57a.

When the corner member 200a is resting on the cover member 50, the coupling projection 57a may be inserted into the insertion hole 250a so that the corner member 200a may rest on and be coupled with the cover member 50. One end of the coupling projection 57a may be in the shape of a hook to be hooked to the first surface 210a when the corner member 200a is resting on the surface 54a. However, one end of the coupling protrusion 57a may not be in the shape of a hook. In this case, the coupling projection 57a may be inserted into the insertion hole 250a to fix the corner member 200a.

Although not shown in the drawings, the coupling protrusion 57a may be opposite to the insertion hole 250a. That is, the coupling projection 57a may be provided on the corner member 200a. The coupling projection 57a may protrude downward from the first surface 210a, and the insertion hole 250a corresponding to the coupling projection 57a may be provided in the resting surface 54a so that the coupling projection 57a can be inserted into the insertion hole 250a when the corner member 200a is resting on the surface 54a.

Hereinafter, a corner member 200b according to another embodiment of the present disclosure will be described. The remaining configuration of the corner member 200b except for the configuration of the corner member 200b which will be described below is the same as the configuration according to the above-described example embodiment of the present disclosure, and a description thereof will be omitted.

Figure 15:
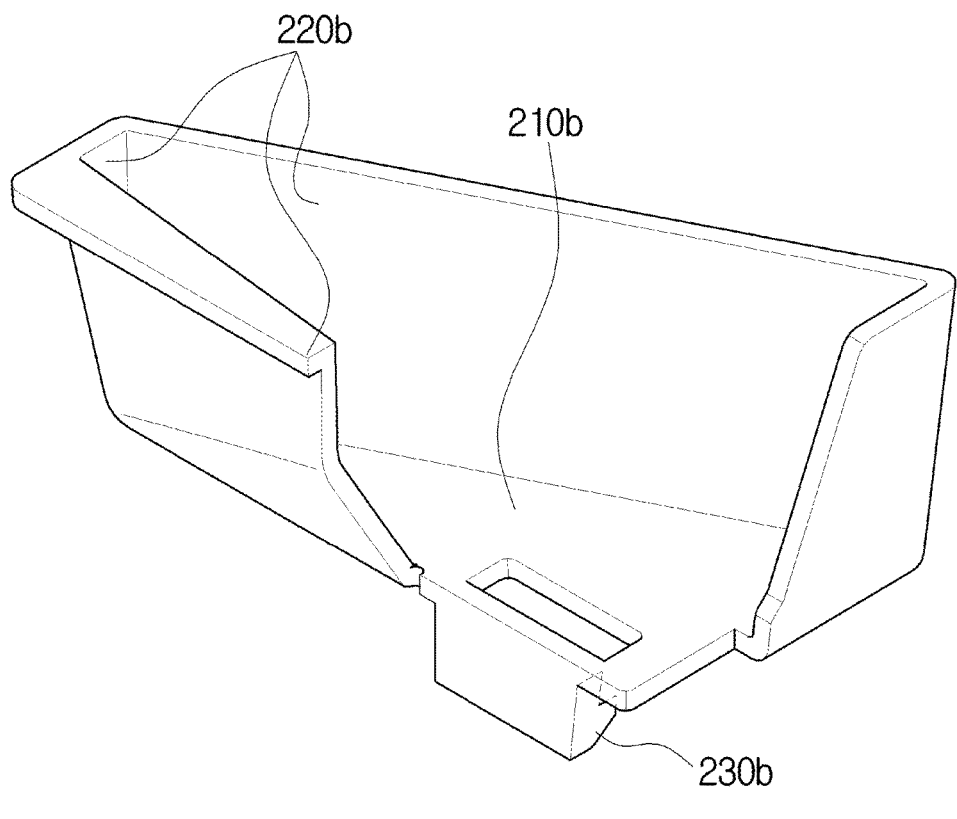
FIG. 15 is a perspective view of a corner member of an example display apparatus according to another example embodiment of the present disclosure.

Referring to FIG. 15, corner member 200b may include no guide portion unlike the corner member 200 according to the above-described example embodiment of the present disclosure. The corner member 200b may be disposed in the corner area 55 to improve dark areas generated on the display panel 10. The PCB 11 may be fixed on the cover member 50 by an adhesive tape, or by a separate support structure.

As described above, according to the present disclosure, it is possible to effectively improve a dark area generated at corners through the corner member in the display apparatus that irradiates light generated from the plurality of light sources to the display panel through the reflecting member without a member such as a light guide plate The present disclosure is not limited to the above-described example embodiments, and it should be understood by those skilled in the art that various modifications and changes may be made without departing from the scope of the present disclosure. Therefore, modified or changed embodiments are included in the range of the claims of the present disclosure.

What is claimed is:
1. A display apparatus comprising:
   a display panel comprising a pair of first sides and a pair of second sides;
   a cover configured to support the display panel;
   a light source module comprising a light source and extending along at least one of the pair of first sides of the display panel, said light source module being disposed adjacent to at least one of the pair of first sides;
   a first reflecting member comprising a reflective surface configured to reflect light emitted from the light source module toward the display panel;
   a second reflecting member comprising a reflective surface configured to reflect the light emitted from the light source module toward the first reflecting member; and
   at least one corner members comprising a reflective surface disposed between the pair of second sides and one end of the light source module in longitudinal direction.

2. The display apparatus of claim 1, wherein the at least one corner member is configured to reflect incident light toward at least one of: the first reflecting member, the second reflecting member, or the display panel.

3. The display apparatus of claim 1, further comprising a chassis disposed in a front direction of the display panel configured to display an image thereon,
   wherein the cover comprises a coupling portion extending forward from both ends of the cover corresponding to the pair of second sides and configured to be coupled with the chassis, and the cover further comprises an inclined portion extending backward from the coupling portion and inclined with respect to the coupling portion, and
   the at least one corner member being disposed to be in contact with the coupling portion and the inclined portion.

4. The display apparatus of claim 3, wherein the cover further comprises a support portion extending from the coupling portion and configured to support the display panel, and
   the at least one corner member being disposed in a space between the coupling portion, the inclined portion, and the support portion.

5. The display apparatus of claim 4, wherein the cover further comprises a resting surface extending from one edge of at least one of: the coupling portion, the inclined portion, and the support portion, and formed in the space, and the at least one corner member is configured to rest on the resting surface.

6. The display apparatus of claim 5, wherein the at least one corner member further comprises a hook portion configured to engage the resting surface.

7. The display apparatus of claim 5, wherein the resting surface comprises a coupling protrusion protruding upward in a direction in which the pair of second sides extend, and
   the corner member further comprises an insertion hole configured to receive the coupling protrusion for insertion.

8. The display apparatus of claim 5, wherein the at least one corner member is configured to rest along a direction in which the pair of second sides extend.

9. The display apparatus of claim 5, wherein the at least one corner member further comprises a first surface corresponding to the resting surface and facing upward, and a second surface extending from the first surface in the direction in which the pair of second sides extend and formed along the coupling portion, the inclined portion, and the support portion.

10. The display apparatus of claim 9, wherein the first surface and the second surface include a white color.

11. The display apparatus of claim 1, further comprising a printed circuit board (PCB) electrically connected to the display panel,
 wherein the at least one corner member comprises a guide portion configured to guide a position of the PCB.

12. The display apparatus of claim 11, wherein the guide portion comprises a first extending portion extending downward along a direction in which the pair of second sides extend, at one edge of the at least one corner member comes into contact with the resting portion, and a second extending portion bent and extending from the first extending portion, and
 wherein the PCB is disposed in space formed between the first extending portion and the second extending portion.

13. The display apparatus of claim 12, wherein the guide portion is configured to guide the PCB such that a mounting surface on which electrical components are mounted is disposed to face the direction in which the pair of second sides extend.

14. The display apparatus of claim 11, further comprising:
 a support disposed on the cover, and configured to support the light source module and the second reflecting member; and
 a gasket configured to electrically connect the support to the PCB.

15. A display apparatus comprising:
 a display panel configured to display an image thereon;
 a chassis disposed in a front direction of the display panel;
 a cover configured to support the display panel, and configured to be coupled with a rear portion of the chassis, the cover including a coupling portion extending forward from both ends of the cover member and configured to be coupled with the chassis, and an inclined portion extending backward from the coupling portion and inclined with respect to the coupling portion;
 a light source module comprising a light source disposed behind the display panel, and disposed along a side direction of the display panel; and
 a corner member comprising a reflective surface disposed in a corner area between the coupling portion, the inclined portion, and outer portions of both ends of the light source module and configured to reflect light generated from the light source module,
 wherein the cover further comprises a resting surface extending from one edge of at least one of the coupling portion and the inclined portion, and formed in the corner area, and the corner member is configured to be hooked to the resting surface.

16. The display apparatus of claim 15, further comprising:
 a first reflecting member comprising a reflective surface disposed on a front surface of the cover member and configured to reflect light irradiated from the light source module toward the display panel; and
 a second reflecting member comprising a reflective surface disposed between the light source module and the first reflecting member and configured to reflect light irradiated from the light source module toward the first reflecting member so that the light reflected by the second reflecting member arrives at the first reflecting member,
 wherein the corner member reflects incident light toward at least one of: the first reflecting member, the second reflecting member, or the display panel.

17. The display apparatus of claim 15, further comprising a Printed Circuit Board (PCB) electrically connected with the display panel,
 wherein the corner member comprises a guide portion configured to guide a position of the PCB.

18. A display apparatus comprising:
 a display panel configured to display an image thereon;
 a printed circuit board (PCB) electrically connected to the display panel;
 a cover disposed behind the display panel, and configured to support the display panel;
 a light source module comprising a light source disposed between the display panel and the cover, and arranged toward the cover;
 a first reflecting member comprising a reflective surface disposed in a front direction from the cover, and configured to reflect light emitted from the light source module toward the display panel;
 a second reflecting member comprising a reflective surface disposed between the light source module and the first reflecting member, and configured to reflect light emitted from the light source module toward the first reflecting member so that the light reflected by the second reflecting member arrives at the first reflecting member;
 a corner member comprising a reflective surface disposed in a corner area formed between the outer portions of both ends of the second reflecting member and the inner portions of both corners of the cover, and configured to guide a position of the PCB such that the PCB is positioned below the display panel.

19. The display apparatus of claim 18, wherein the cover is configured to reflect incident light toward at least one of: the first reflecting member, the second reflecting, or the display panel.

* * * * *